April 27, 1948.   J. S. ERICKSON   2,440,397
IMMERSION TYPE REFRIGERATING DEVICE
Filed May 6, 1944   3 Sheets-Sheet 1

Inventor:
James S. Erickson
By Evans, Pond & Anderson
Attys.

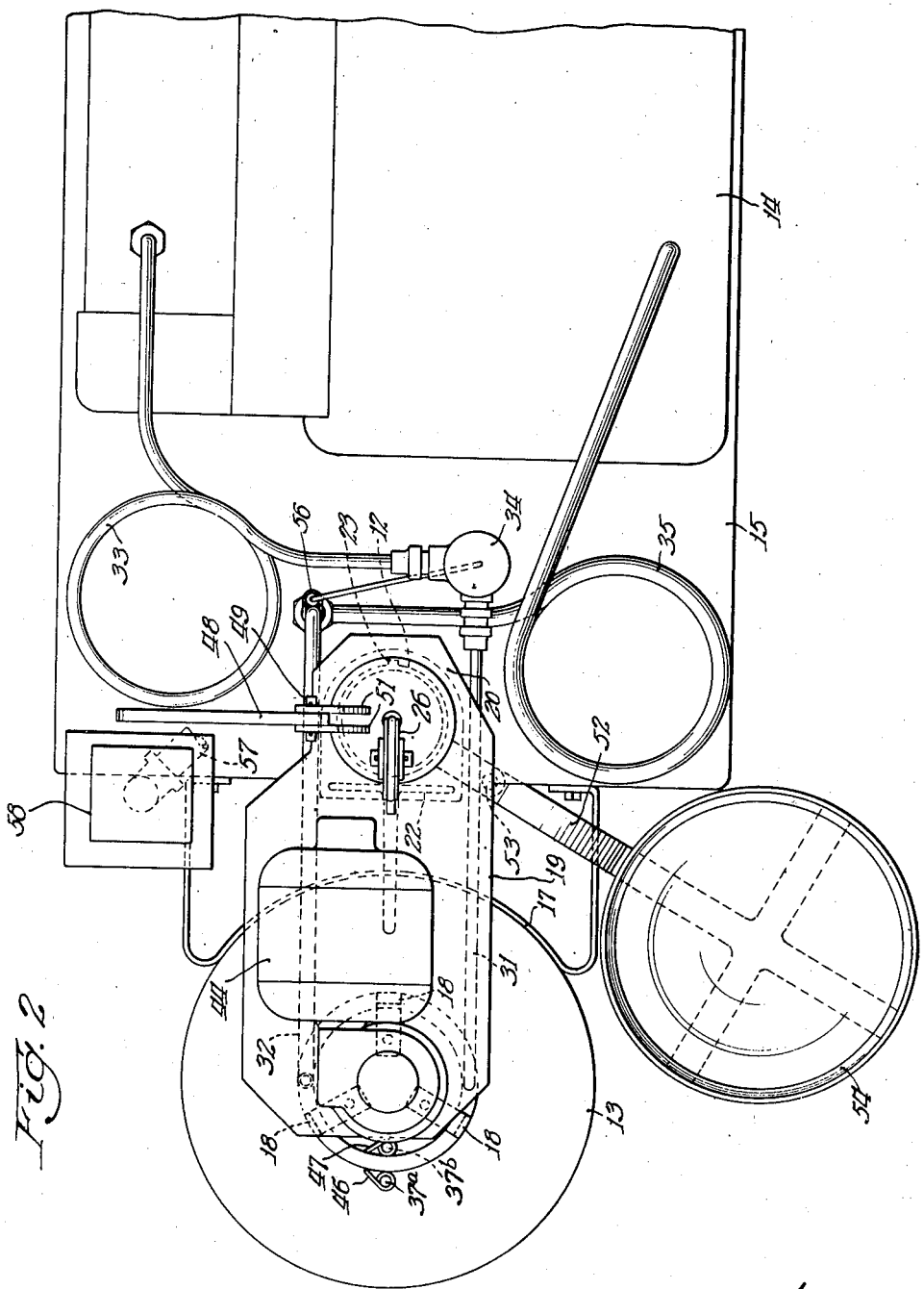

April 27, 1948. J. S. ERICKSON 2,440,397
IMMERSION TYPE REFRIGERATING DEVICE
Filed May 6, 1944 3 Sheets-Sheet 3
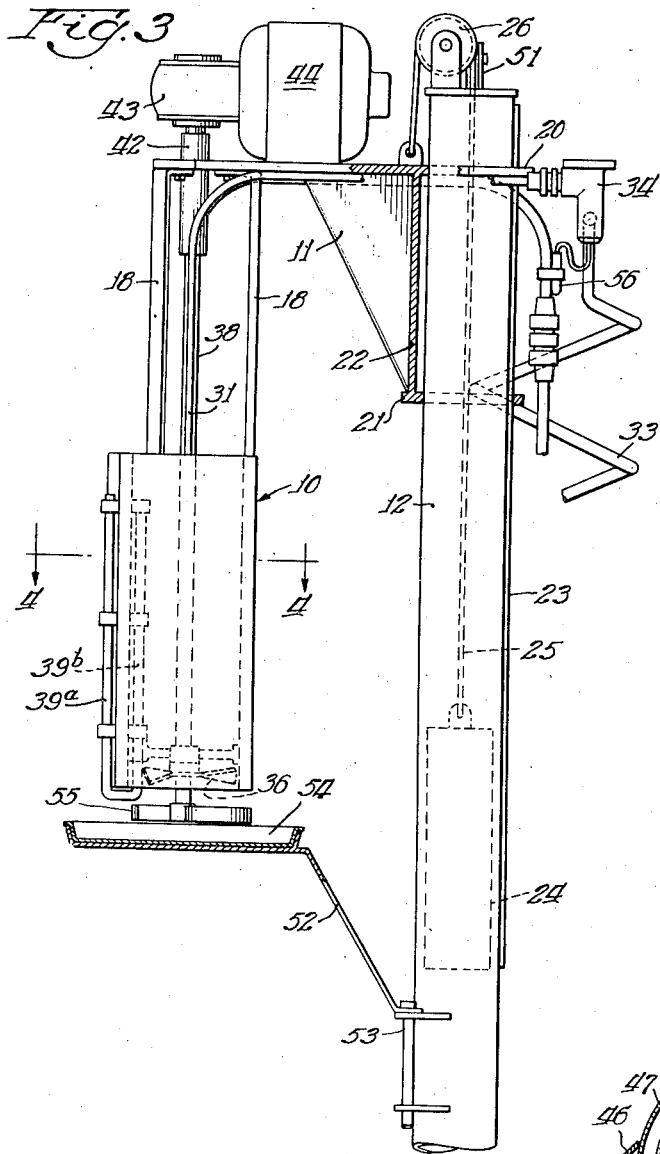
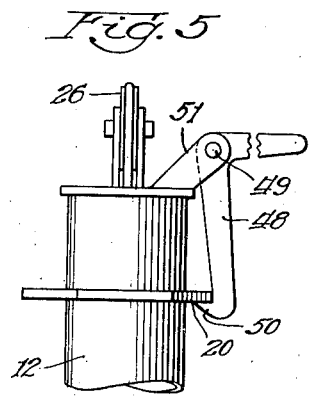
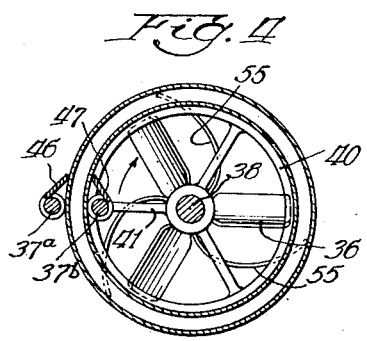
Inventor:
James S. Erickson
By: Soans, Pond + Anderson
Attys.

Patented Apr. 27, 1948

2,440,397

UNITED STATES PATENT OFFICE 2,440,397

IMMERSION TYPE REFRIGERATING DEVICE

James S. Erickson, Danville, Ill., assignor to Sugar Creek Creamery Company, Danville, Ill., a corporation of Delaware Application May 6, 1944, Serial No. 534,486

8 Claims. (Cl. 62—141)

This invention relates to a refrigerating device which is designed particularly for the purpose of providing a more efficient means to cool cream when received at the creamery or at cream collecting stations from the dairymen. It is, however, adaptable to the cooling of other liquids under conditions more or less similar to those met in the cooling of cream in a conventional cream can.

The customary manner of cooling cream at a receiving station is to place the can of cream in a large tank filled with ice water, or filled with mechanically cooled brine. Such tanks are very expensive and they involve the lifting of the can of cream from the receiving platform over the top of the wall of the cooling tank, and lowering the can into the tank, and again the lifting of the heavy can of cream out of the tank when it has been cooled sufficiently.

This common type of cooler usually requires from two to two and one-half hours to reduce the temperature of a can of cream from around 72° F. to 50° F. The length of time required together with the heavy labor involved has resulted, from a practical standpoint, in failure to use the cooler, and sometimes in failure to permit the can of cream to remain in the cooler for a sufficient period of time to produce effective results so that by the time the can of cream reaches the creamery, the quality of the cream has greatly deteriorated.

The objects of the present invention are to provide a cream cooler which will eliminate most of the heavy work involved in the conventional method of cooling a can of cream as above explained; to provide a cream cooler which will be operative to rapidly reduce the temperature of a can of cream so that a single device will be capable of cooling a considerable number of cans of cream within a given period of time; to provide a refrigerating device which is capable of quickly cooling liquid in a container, and in general, it is the object of the invention to provide an improved cooler of the character indicated.

Other objects and advantages of the invention will be understood by reference to the following specification and accompanying drawings (three sheets) wherein there is illustrated a cream cooler embodying a selected form of the invention.

In the drawings,

Fig. 2 is a plan;

Fig. 3 is an elevational view corresponding to a portion of Fig. 1, but showing a changed position;

Fig. 4 is a plan section on the line 4—4 of Fig. 3; and

Fig. 5 is a fragmentary view illustrating a detail of construction.

Figure 1:
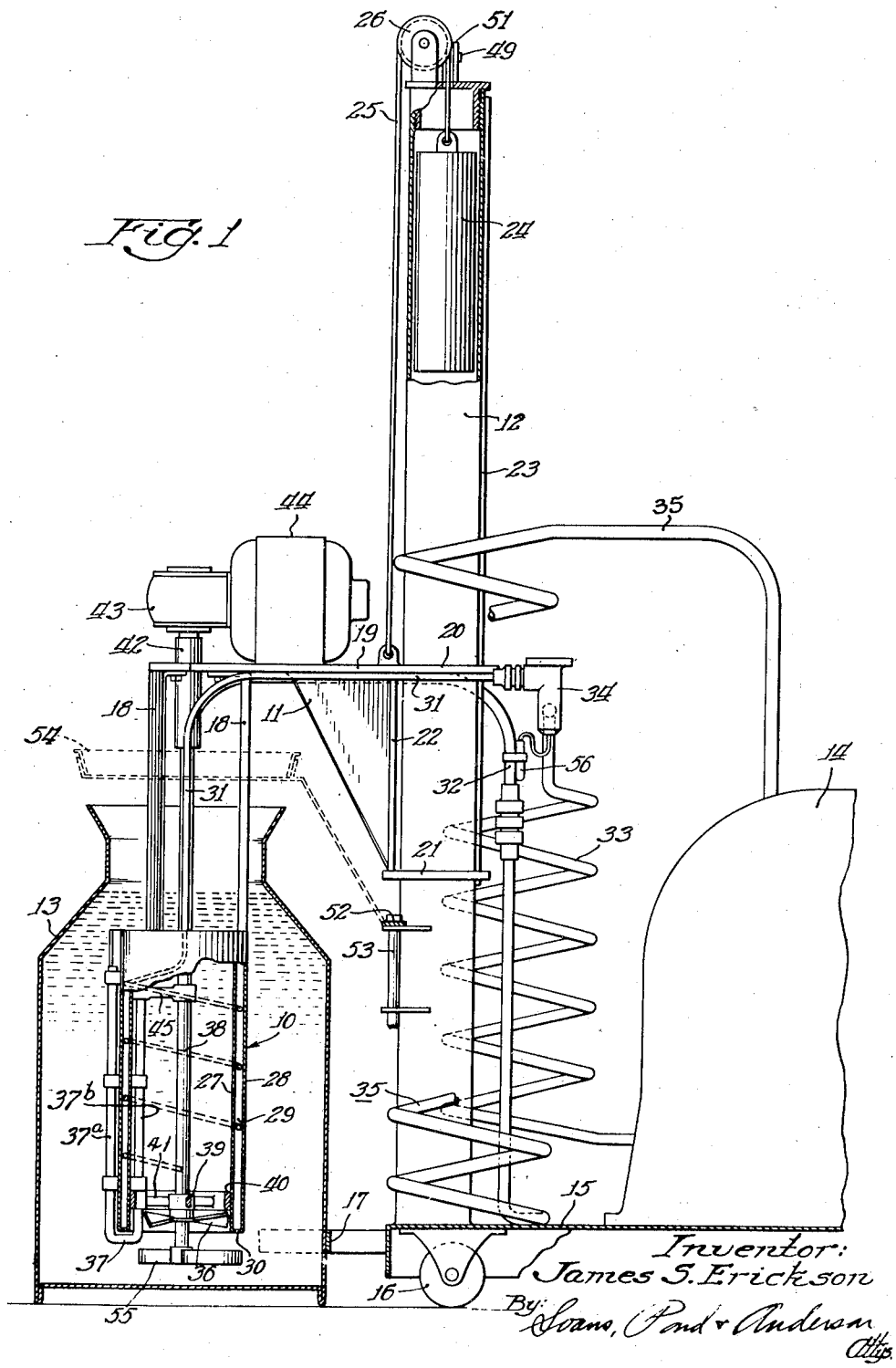
Fig. 1 is a side elevation, parts being broken away and shown in section to more clearly illustrate the structure.

The improved cream cooler herein disclosed embodies a cooling unit or expansion chamber member 10, which is suspended from a bracket 11 vertically slidably mounted on a post 12. The expansion chamber, or cooling unit 10 is adapted to be immersed in the cream in a conventional cream can 13, and refrigerant is supplied to the cooling chamber 10 by means of a conventional compressor unit 14.

The post 12 is preferably a hollow or tubular post which extends upwardly from a suitable base or platform 15, mounted on rollers or casters such as indicated at 16, to permit convenient and easy movement of the device from place to place. The compressor unit 14 is mounted in fixed position on the platform 15, and may include the necessary driving motor, which is preferably an electric motor, but may, of course, be of any other form. The compressor unit 14 may be any suitable compressor unit, the details of which are not of importance in this application, wherefore such details are not herein illustrated or described. It will, of course, be understood that the apparatus may employ any one of a number of commercially available compressor units, such as used for refrigeration purposes.

The base 15 is provided on its front edge with bracket 17 (see Figs. 1 and 2) which is suitably shaped to facilitate positioning the cream can 13 in predetermined relationship to the post 12, and to the vertical path of movement of the cooling unit 10. Suitable brake or holding means (not shown) may be provided for holding the cooler structure, including the platform 15, in a stationary position when it is in use.

The cooling unit 10 is suspended from the bracket 11 by means of a plurality of vertically extending straps or hangers 18, which are fixedly attached at their upper ends to the top platform portion 19 of the said bracket 11. The bracket 11 includes rearwardly extending portions 20 and 21 which are adapted to slidably fit around the post 12, the upper and lower bracket portions 20 and 21 being rigidly and preferably integrally interconnected by means of suitable vertically extending bracket portions 22. The post 12 is provided with a vertically extending, rearwardly projecting key 23, and the bracket parts 20 and 21 are provided with corresponding keyways to receive said key 23 whereby the bracket 11 is vertically slidable on the post 12, but locked against rotary movement thereon. To facilitate raising and lowering of the bracket 11 and parts carried thereby, a counterweight 24 is located within the tubular post 12 and connected by means of a suitable flexible cord or cable 25 to the top portion 19 of the bracket 11. Said cable is guided around a pulley 26 mounted on the top of the post 12.

The cooling unit 10 is in the form of a hollow tubular cylinder embodying inner and outer cylindrical walls 27 and 28 respectively, the inner cylinder 27 being sufficiently smaller in diameter than the outer cylinder 28 to provide therebetween refrigerant expansion space 29. At their ends, the cylinders 27 and 28 are interconnected by end walls such as indicated at 30, which close the expansion space or chamber 29. The refrigerant is delivered to the expansion chamber 29 by means of an inlet pipe or tube 31, which may extend through the top wall of the chamber and continue spirally downwardly between the walls of the chamber to near the bottom thereof. The expanded or evaporated refrigerant escapes from the chamber 29 by flowing upwardly in the chamber in the spiral passageway, which remains between the turns of the spirally arranged inlet pipe, and by means of the outlet pipe or tube 32 which is preferably somewhat larger in diameter than the inlet tube 31. The outlet tube 32 preferably communicates with the expansion chamber at a point approximately diametrically opposed to the point where the inlet tube 31 communicates with the chamber, and the outlet tube 32 preferably terminates just inside of the top wall of the expansion chamber.

The compressor unit 14 is connected to the inlet pipe 31 through the agency of a flexible tube 33, a thermostatic valve 34 being interposed in the connection between the delivery tube 33 from the compressor and the delivery tube 31 of the cooling unit. This thermostatic valve 34 is a commercially available type of valve which is controlled by temperature in such a way that when installed in the relationship described, it will prevent refrigerant from flooding back to the compressor in the form of a liquid. In other words, if the cylinder 10 becomes over-supplied with liquid refrigerant, some of the liquid enters the outlet tubes 32 and passes on to the compressor. Partial evaporation of liquid in tube 32 decreases the temperature of the tube 32 to a point where a thermostatic bulb 56 attached to the tube 32 operates the thermostatic valve 34, causing said thermostatic valve 34 to close until such time as the excess liquid refrigerant has been evaporated.

The discharge tube 32 is similarly connected to the receiving end of the compressor unit by means of a flexible tube 35. The flexible connections 33 and 35 serve to permit the cooling unit 10 and the bracket 11 to which portions of the tubes 31 and 32 may be secured, to move up and down while the compressor unit 14 remains stationary.

With the cooling unit 10, there is associated a propeller 36 and a scraper structure 37. The propeller 36 is mounted within the lower end portion of the tubular cooling unit, and is so pitched as to effect slow circulation of the cream downwardly within the cooling unit. An impeller 55 which rotates in unison with the propeller 36, is provided for co-operation with the propeller 36 to cause the cream to flow outwardly below the cooling unit 10, upwardly outside of said cooling unit, and again downwardly through the cooling unit. The impeller 55 is so formed as to impel the cream laterally outwardly while the propeller 36 feeds it downwardly. The propeller 36 and the impeller 55 are mounted on the lower end of a shaft 38, which is journalled at its lower end in a bearing 39 carried by a collar 40, which fits snugly within the inside of the lower portion of the cooling unit. Suitable spider arms 41 connect the bearing hub 39 with the collar 40. The shaft extends upwardly, and is suitably connected to the output connection 42 of a motor-driven speed-reducing gear unit 43. The speed-reducing gear unit 43 is driven by an electric motor 44, mounted on the top of the bracket 11, the casing of the motor 44 and of the speed reducing unit 43 being preferably built together as a single unit, in accordance with more or less customary practice.

The scraper structure 37 comprises a U-shaped bar embodying outer and inner legs 37a and 37b respectively. The inner leg 37b is rigidly connected to the shaft 38 through the agency of a bracket or arm 45 near the upper end of the cooling unit, and through the agency of a suitable fastening provided as a part of the collar 40 near the lower end of the unit. The arms 37a and 37b each carry scraper blades, such as indicated at 46 and 47 respectively (see Fig. 2), the said scraper blades being operative to prevent accumulation of chilled and more or less congealed cream on the outer and inner surfaces respectively of the cooling unit.

In some instances, for example, where milk or other lighter liquids are to be cooled, the scrapers 37a and 37b may be made to merely keep the liquid moving away from the chilled cylinder, instead of more or less actually scraping chilled material (such as cream) from the cylinder.

The shaft 38 is preferably driven at a relatively low rate of speed, which may be in the neighborhood of 95 R. P. M. High speed should, of course, be avoided so as to avoid any tendency of churning the cream into butter. In the scraper arrangement shown in Fig. 2, the direction of rotation of the shaft 38 and the scrapers would be counter-clockwise, and the propeller 36 is accordingly pitched to effect downward circulation of the cream within the cooling unit 10.

It has been found that the cream cooler described is capable of reducing the temperature of the usual can of cream (about 80 pounds) at the rate of about 2° per minute average between 72° F. and 50° F. Hence, a can of cream received from the farmer at about 72° F. may be cooled to a satisfactory preservative temperature of about 50° F. or 52° F. in about 10 minutes, whereas in the conventional brine tank, a cooling period of from two to two and one-half hours is usually required to effect such cooling.

In using the mechanism described, the cooling unit, including the motor 44 and the bracket 11, are initially moved to an elevated position on the post 12, as shown in Fig. 3. The can of cream is then placed against the stop 17, whereupon the cooling unit may be lowered and immersed in the cream and the cooling operation started. It will be observed that with this arrangement, the can of cream need not be actually lifted from the floor, but may be more or less rolled on its bottom edge into place against the stop 17. Hence, there is no heavy labor requirement in respect of the handling of the cream. The counterweighted arrangement of the cooling unit, and its supporting bracket, makes it easy to lower and raise the unit without the expenditure of any great amount of effort. The counterweight is preferably slightly lighter than the cooling unit and the vertically movable structure associated therewith, so that when the cooling unit is lowered, it will tend to remain in such lower position as may be desired.

The cooling unit is maintained in elevated position by a suitable locking device, one such device being shown in Figs. 2 and 5 as including a bell crank type of lever 48, pivotally mounted as indicated at 49 on bracket arms 51 extending from the top of the post. One arm of the bell crank lever extends downwardly, and is provided with a tooth 50, which is adapted to engage under a side part of the rearwardly extending bracket portion 20. The other arm of the bell crank extends horizontally outwardly, as indicated, and constitutes an operating lever by which the lock may be disengaged when the cooling unit is to be lowered. The lower end of the depending arm 48 is suitably beveled as shown, so that upward movement of the cooling unit to locking position may be effected without manually operating the locking device.

A drip pan 54 may be carried by a bracket 52 which is pivotally mounted as shown at 53 on the post 12.

For controlling the cooling effect, a pressure control valve or the like may be provided as a part of the compressor unit. Such a valve is usually a part of the compressor equipment and by appropriately regulating it, the equipment is automatically stopped when the cream (or other material being cooled) reaches the desired temperature. It is, of course, important that the cream be not cooled so quickly that it will freeze to the cooling unit, notwithstanding the provision of the scrapers, and, of course, the speed of rotation of the scrapers and of the propeller must be maintained low enough to avoid churning of the cream as already indicated.

The described arrangement wherein the cooling unit is vertically movable on the supporting post is preferable, but the arrangement may be so reversed that the cooling unit remains in a fixed elevated position, and the cream can, or other fluid container, may be elevated to surround the cooling unit whereby the latter is, in effect, immersed in the content of the container. In the latter arrangement, the weight of the filled cream can, which would be considerably greater than the weight of the cooling unit and associated vertically movable parts, would have to be elevated but suitable counterweighting means may be provided to facilitate such movement of the relatively heavy can and its content. The latter arrangement would have the advantage of eliminating the necessity for flexible conduit connections between the cooling unit and the compressor or refrigerant supplying unit.

Suitable control for starting and stopping the refrigerant supplying unit 14 may be provided as a part of the unit. In this instance, there is illustrated a portion of a conduit 57 for conducting suitable electrical wires from the unit 14 to suitable starting switch mechanism represented at 58, the latter being suitably mounted on the post 15.

Various changes may be made in the described structure without departing from the principles of the invention as described.

I claim:

1. A cream cooler of the class described, comprising a cooling unit adapted to be immersed in cream contained in a conventional cream can, means for vertically adjustably supporting said cooling unit to thereby facilitate lowering of the unit into a can of cream positioned thereunder, means for supplying refrigerant to said cooling unit, a scraper adapted to be moved over the cooling surface of said cooling unit to prevent accumulation of chilled and more or less congealed cream on said surface, and means for actuating said scraper.

2. In a cooling device of the class described, the combination of a cooling unit adapted to be immersed in liquid in a container, said unit comprising a hollow tubular unit wherein the hollow of the unit constitutes a chamber for the vaporization of refrigerant, movable means positioned with respect to the inner and outer surfaces of said tubular unit so as to be capable, upon movement relative to said unit, of displacing material from said surfaces, means for effecting movement of said movable means relative to said surfaces, means for supplying refrigerant to said chamber comprising a conduit entering the upper end portion of said unit and spiralling downwardly therein intermediate the inner and outer walls thereof, said conduit having an open end adjacent the bottom of the unit for discharging the refrigerant in the lower end portion of the unit, and an exhaust conduit connected to the upper end portion of said unit and communicating with the upper end portion of said chamber, said spirally arranged delivery conduit serving to cause the refrigerant to circulate around the unit in its movement upwardly toward said exhaust conduit connection.

3. In a cooling device of the class described, the combination of a cooling unit adapted to be immersed in liquid in a receptacle, said unit comprising a hollow, cylindrical, tubular member embodying inner and outer cylindrical walls, the space between said inner and outer walls constituting a chamber for the vaporization of refrigerant, there being end closures for said chamber connecting the opposite ends of said inner and outer walls, means for delivering and exhausting refrigerant to and from said chamber, a rotatable shaft disposed axially of said unit, scrapers carried by said shaft and respectively disposed with respect to said inner and outer surfaces so as to be effective, upon rotation with said shaft, to displace material from said inner and outer surfaces respectively, and a propeller carried by said shaft adjacent one end of said cooling unit for effecting circulation of liquid axially around said cooling unit.

4. In a cooling device of the class described, the combination of a cooling unit adapted to be immersed in liquid in a receptacle, said unit comprising a hollow, cylindrical, tubular member embodying inner and outer cylindrical walls, the space between said inner and outer walls constituting a chamber for the circulation of refrigerant, there being end closures for said chamber, means for delivering and exhausting refrigerant to and from said chamber, a rotatable shaft disposed axially of said unit, scrapers carried by said shaft and respectively disposed with respect to said inner and outer surfaces so as to be effective, upon rotation with said shaft, to displace material from said inner and outer surfaces respectively, and a propeller carried by said shaft adjacent the lower end thereof and operative upon rotation with the shaft to effect movement of the liquid radially of the lower end of said unit.

5. In a cooling device of the class described, the combination of a cooling unit adapted to be immersed in liquid in a receptacle, said unit comprising a hollow, cylindrical, tubular member embodying inner and outer cylindrical walls, the space between said inner and outer walls constituting a chamber for the circulation of refrigerant, there being end closures for said chamber, means for delivering and exhausting refrigerant to and from said chamber, a rotatable shaft disposed axially of said unit, scrapers carried by said shaft and respectively disposed with respect to said inner and outer surfaces so as to be effective, upon rotation with said shaft, to displace material from said inner and outer surfaces respectively, and a pair of propellers carried by the lower end portion of said shaft, one of said propellers being disposed within said unit and operative upon rotation with said shaft to effect circulation of liquid axially around said unit, the other propeller being disposed adjacent but below the lower end of said unit and operative, upon rotation with said shaft, to effect movement of liquid radially of the lower end of said unit.

6. In a cooling device of the class described, the combination of a cooling unit adapted to be immersed in liquid in a receptacle, said unit comprising a hollow, cylindrical, tubular member embodying inner and outer cylindrical walls, the space between said inner and outer walls constituting a chamber for the circulation of refrigerant, there being end closures for said chamber, means for delivering and exhausting refrigerant to and from said chamber comprising a conduit entering said chamber and spiralling downwardly therein in relatively spaced turns intermediate said inner and outer walls and arranged to discharge refrigerant in the lower portion of said chamber, and exhaust conduit communicating with the upper portion of said chamber, said spirally arranged delivery conduit serving to cause the refrigerant to circulate around the unit in its movement toward said exhaust conduit.

7. In a cooling device of the class described, the combination of a cooling unit adapted to be immersed in liquid in a receptacle, said unit comprising a hollow, cylindrical, tubular member embodying inner and outer cylindrical walls, the space between said inner and outer walls constituting a chamber for the circulation of refrigerant, there being end closures for said chamber, means for delivering and exhausting refrigerant to and from said chamber comprising a conduit entering said chamber and spiralling downwardly therein in relatively spaced turns intermediate said inner and outer walls and arranged to discharge refrigerant in the lower portion of said chamber, an exhaust conduit communicating with the upper portion of said chamber, said spirally arranged delivery conduit serving to cause the rfrigerant to circulate around the unit in its movement toward said exhaust conduit, and means movable over the exposed surfaces of said inner and outer walls to displace material therefrom so as to prevent the material being cooled from accumulating and freezing on said surfaces.

8. In a cooling device of the class described, the combination of a cooling unit adapted to be immersed in liquid in a receptacle, said unit comprising an axially vertical, hollow, cylindrical, tubular member closed at its ends, the hollow of said member constituting a chamber for the vaporization of refrigerant, movable means positioned with respect to the inner and outer surfaces of said tubular unit so as to be capable, upon movement circumferentially around said member, of displacing material from said surfaces, a propeller arranged to effect circulation of the liquid axially around the tubular cooling unit, means for actuating said movable means and said propeller, and means for delivering refrigerant to said chamber and exhausting vaporized refrigerant therefrom.

JAMES S. ERICKSON.

REFERENCES CITED

The following references are of record in the file of this patent:

UNITED STATES PATENTS

| Number | Name | Date |
|---|---|---|
| 1,020,759 | Holden | Mar. 19, 1912 |
| 1,738,953 | Jensen | Dec. 10, 1929 |
| 1,959,120 | Ziska | May 15, 1934 |
| 2,283,904 | Baumgarden | May 26, 1942 |
| 2,299,414 | Spiegl | Oct. 20, 1942 |
| 2,319,429 | Melson | May 18, 1943 |